(12) United States Patent
Shepard et al.

(10) Patent No.: US 7,810,870 B2
(45) Date of Patent: Oct. 12, 2010

(54) VEHICLE BODY STRUCTURE

(75) Inventors: Brian C Shepard, Ypsilanti, MI (US); Dave Coakley, Macomb Township, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 108 days.

(21) Appl. No.: 12/251,185

(22) Filed: Oct. 14, 2008

(65) Prior Publication Data

US 2010/0090499 A1  Apr. 15, 2010

(51) Int. Cl.
*B62D 25/08* (2006.01)
(52) U.S. Cl. .................... 296/187.09; 293/102; 293/146
(58) Field of Classification Search ................ 293/102, 293/120, 121, 132, 133, 142–144, 146–148, 293/151–153; 296/187.09, 187.11, 187.04
See application file for complete search history.

(56) References Cited

U.S. PATENT DOCUMENTS

| | | | | |
|---|---|---|---|---|
| 2,245,848 | A | * | 6/1941 | Bagnall ...................... 293/115 |
| 4,359,239 | A | * | 11/1982 | Eggert, Jr. ................... 293/132 |
| 6,139,044 | A | * | 10/2000 | Smith et al. ................. 280/505 |
| 6,634,702 | B1 | * | 10/2003 | Pleschke et al. ......... 296/187.04 |
| 6,652,010 | B1 | * | 11/2003 | Huddle et al. ............... 293/102 |
| 7,163,243 | B2 | * | 1/2007 | Evans ........................ 293/121 |
| 7,216,904 | B2 | | 5/2007 | Thomas |
| 7,284,788 | B1 | | 10/2007 | Barbat et al. |
| 7,552,955 | B2 | * | 6/2009 | Evans ........................ 293/120 |
| 7,681,943 | B2 | * | 3/2010 | Murata et al. .......... 296/203.02 |
| 2006/0220399 | A1 | | 10/2006 | Fortin |
| 2010/0052342 | A1 | * | 3/2010 | Wurtemberger ............. 293/132 |

OTHER PUBLICATIONS

"Enhancing vehicle-to-vehicle crash compatibility", Dec. 2, 2003, 14 pages.
Barbat et al., "Vehicle compatibility assessment using test data of full frontal vehicle-to-vehicle and vehicle-to-full width deformable barrier impacts", 16 pages, Ford Motor Company, USA.

* cited by examiner

*Primary Examiner*—Jason S Morrow
(74) *Attorney, Agent, or Firm*—Global IP Counselors, LLP (57) ABSTRACT

A vehicle body stricture includes a vehicle frame having a pair of longitudinally extending first frame members spaced apart from one another supporting opposite lower side portions of a vehicle and a laterally extending second frame member extending between respective front portions of the first frame members. A vehicle body is supported on the vehicle frame. A bumper assembly is supported by at least one of the first frame members and the second frame member having a front bumper facia member with a lower edge that extends downward toward an underside of the second frame member. A compatibility member extends laterally between the first frame members, with at least a portion of the compatibility member extending below the second frame member. The compatibility member has at least one attachment point fixed to the second frame member.

25 Claims, 7 Drawing Sheets

VEHICLE BODY STRUCTURE

BACKGROUND OF THE INVENTION

1. Field of the Invention

The present invention relates to a vehicle body structure that includes a front end secondary energy absorbing structure. More specifically, the present invention relates to a vehicle body structure that includes an energy absorbing structural member positioned behind a lower portion of a vehicle bumper facia member and below primary energy absorbing structures of the vehicle.

2. Background Information

In recent years, all passenger vehicles manufactured for the U.S. market include some sort of primary energy absorbing structure. Primary energy absorbing structures typically include frame elements with crumple zones and an energy absorbing bumper assembly.

Crumple zones are areas of a vehicle, for example, in the vehicle frame structure and other portions of the vehicle, that are designed and dimensioned to deform in response to an impact event thus absorbing impact energy from the impact event.

The energy absorbing bumper assembly of most vehicles includes an energy absorbing member and/or structure that is covered by a flexible fascia member. Typically, the flexible fascia member extends several centimeters or inches below a bottom edge of the energy absorbing member and below a bottom edge of vehicle frame elements that make up a portion of the primary energy absorbing structure of the vehicle.

Many vehicles such as sports utility vehicles (SUVs), large vans, commercial trucks and full sized pickup trucks typically have a front end that is spaced apart from the ground by a relatively large distance in an unloaded state (no cargo loaded in the vehicle). Smaller vehicles, such as compact cars and sports cars, generally sit low to the ground.

During impact events, such as front end collision tests with static structures, such as concrete barriers, the crumple zones and energy absorbing bumper assembly absorb impact energy thereby adding a level of protection to vehicle occupants.

A problem occurs when a smaller vehicle is tested with a larger vehicle in front end to front end collision tests. Specifically, since the underside of the larger vehicle sits high above the ground compared to the smaller vehicle, it is possible for the smaller vehicle to impact the larger vehicle below the primary energy absorbing structures of the larger vehicle. Consequently, the smaller vehicle can be wedged under the larger vehicle such that the primary energy absorbing structures of both vehicles are unable to absorb energy as much impact energy from the impact event of the collision test. In such front end to front end collision tests, the lower portion of the flexible fascia member of the larger vehicle is damaged and the hood of the smaller vehicle is also damaged.

In recent years automobile manufacturers have been cooperating with the National Highway Traffic Safety Administration to develop standard test criteria to test vehicle-to-vehicle front end collision compatibility. The results of this cooperation include voluntary development of a secondary energy absorbing structure positioned below the primary energy absorbing structures of a larger vehicle where the primary energy absorbing structures of that large vehicle are located at or above a predetermined distance above the ground (with the vehicle in an unloaded, cargo free state).

In view of the above, it will be apparent to those skilled in the art from this disclosure that there exists a need for an improved vehicle body structure that includes a secondary energy absorbing structure. This invention addresses this need in the art as well as other needs, which will become apparent to those skilled in the art from this disclosure.

SUMMARY OF THE INVENTION

One object of the present invention is to improve safety in the even of a front end to front end collision between vehicles of differing heights.

Another object of the present invention is to provide an underside of a vehicle with a secondary energy absorbing structure located under primary energy absorbing structures.

In accordance with one aspect of the present invention, a vehicle body structure includes a vehicle frame having a pair of longitudinally extending first frame members spaced apart from one another supporting opposite lower side portions of a vehicle and a laterally extending second frame member extending between respective front portions of the first frame members. A vehicle body is supported on the vehicle frame. A bumper assembly is supported by at least one of the first frame members and the second frame member having a front bumper facia member with a lower edge that extends downward toward an underside of the second frame member. A compatibility member extends laterally between the first frame members, with at least a portion of the compatibility member extending below the second frame member. The compatibility member has at least one attachment point fixed to the second frame member.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
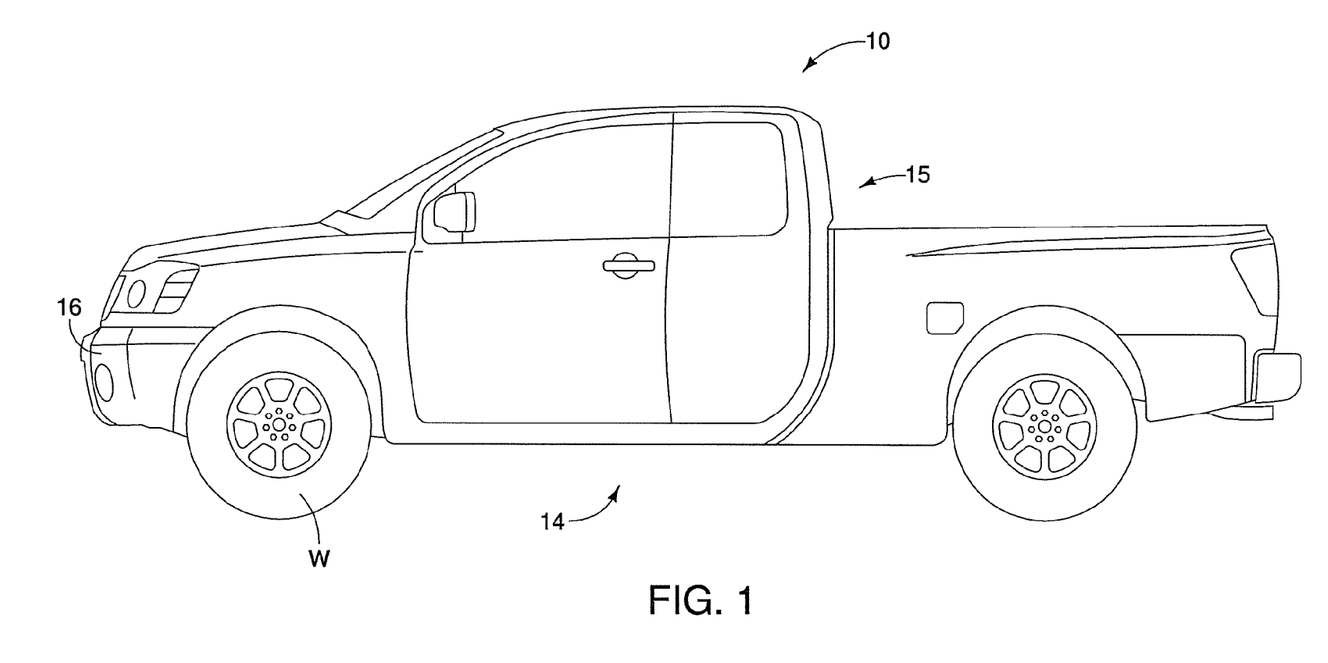
FIG. 1 is a side elevational view of a vehicle showing a vehicle body supported on a vehicle frame in accordance with one embodiment of the present invention.
Figure 2:
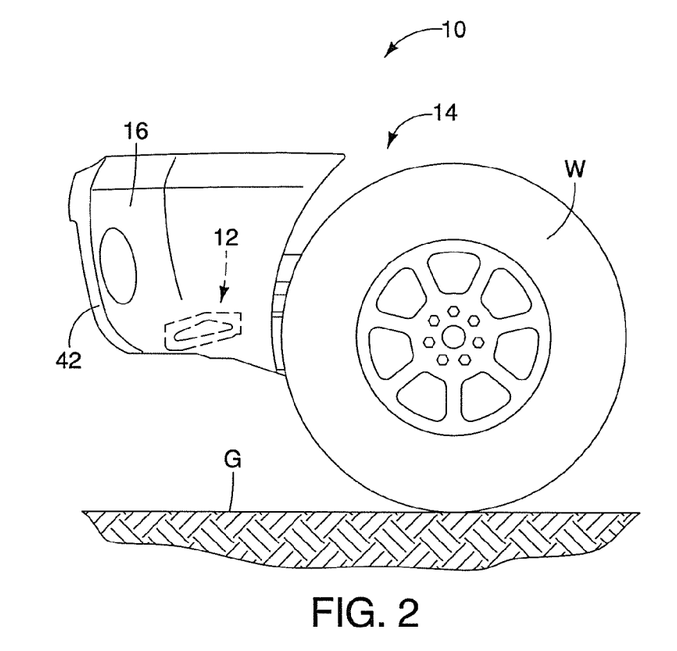
FIG. 2 is a side elevational view of a front end portion of the vehicle showing a compatibility member is phantom in accordance with the present invention.
Figure 3:
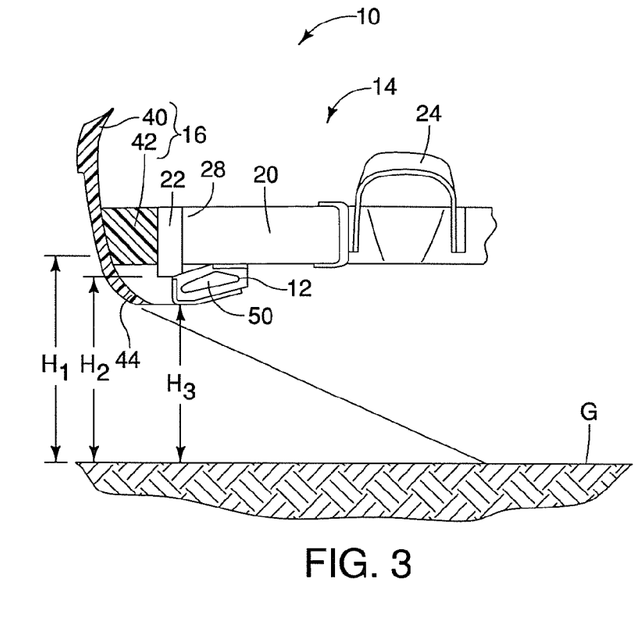
FIG. 3 is a side cross-sectional view of the front end portion of the vehicle showing the compatibility member, portions of the vehicle frame and a bumper assembly with suspension components, engine, transmission and the vehicle body removed to provide greater clarity in accordance with the present invention.

Referring initially to FIG. 1, a vehicle 10 is illustrated in accordance with a one embodiment of the present invention. As indicated in FIGS. 2 and 3, the vehicle 10 includes a compatibility member 12 that extends downward from adjacent frame members to enhance impact compatibility of the vehicle 10, as described in greater detail below. More specifically, the compatibility member 12 is provided to absorb impact energy during impact events with vehicles that are closer to the ground than the vehicle 10.

The vehicle 10 includes, among other things, a vehicle frame 14 (FIGS. 2-5), a vehicle body 15 (FIG. 1 only), a bumper assembly 16 (FIGS. 2 and 3) and the compatibility member 12 (FIGS. 2-8), which together at least partially define a vehicle body structure in accordance with the present invention.

The vehicle frame 14 supports an engine, drive train components, suspension components (not shown) and the vehicle body 15 in a conventional manner. For example, the engine, drive train components, suspension components and the vehicle body 15 are fastened to the vehicle frame 14 in a conventional manner using fasteners and/or welding techniques. The vehicle body 15 includes components such as fenders, pillars, a roof panel, cargo structures and elements that define a passenger compartment and related conventional elements.

In the depicted embodiment, the vehicle frame 14 is for use in a full-sized pickup truck. However, it should be understood from the drawings and the description herein that the vehicle frame 14 and the compatibility member 12 can be used in any of a variety of vehicle applications, such as passenger vehicles, commercial trucks, panel trucks, vans as well as pick-up trucks. More specifically, the compatibility member 12 can be used in any vehicle where the distance between the front end structural support elements are spaced apart from the ground by a distance that could raise height related compatibility issues in a front end to front end collision test.

Figure 4:
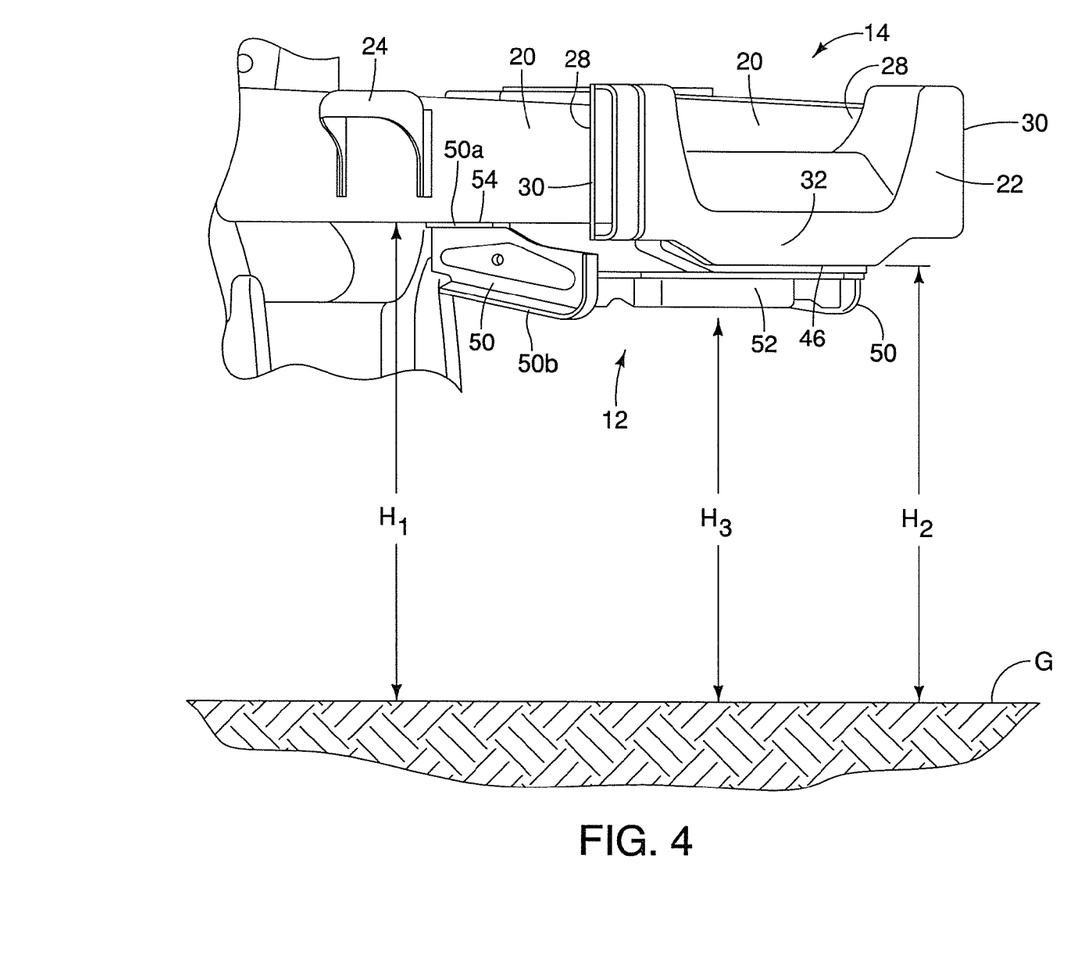
FIG. 4 is a perspective view of a front portion of the vehicle frame showing the compatibility member attached to members of the vehicle frame in accordance with the present invention.
Figure 5:
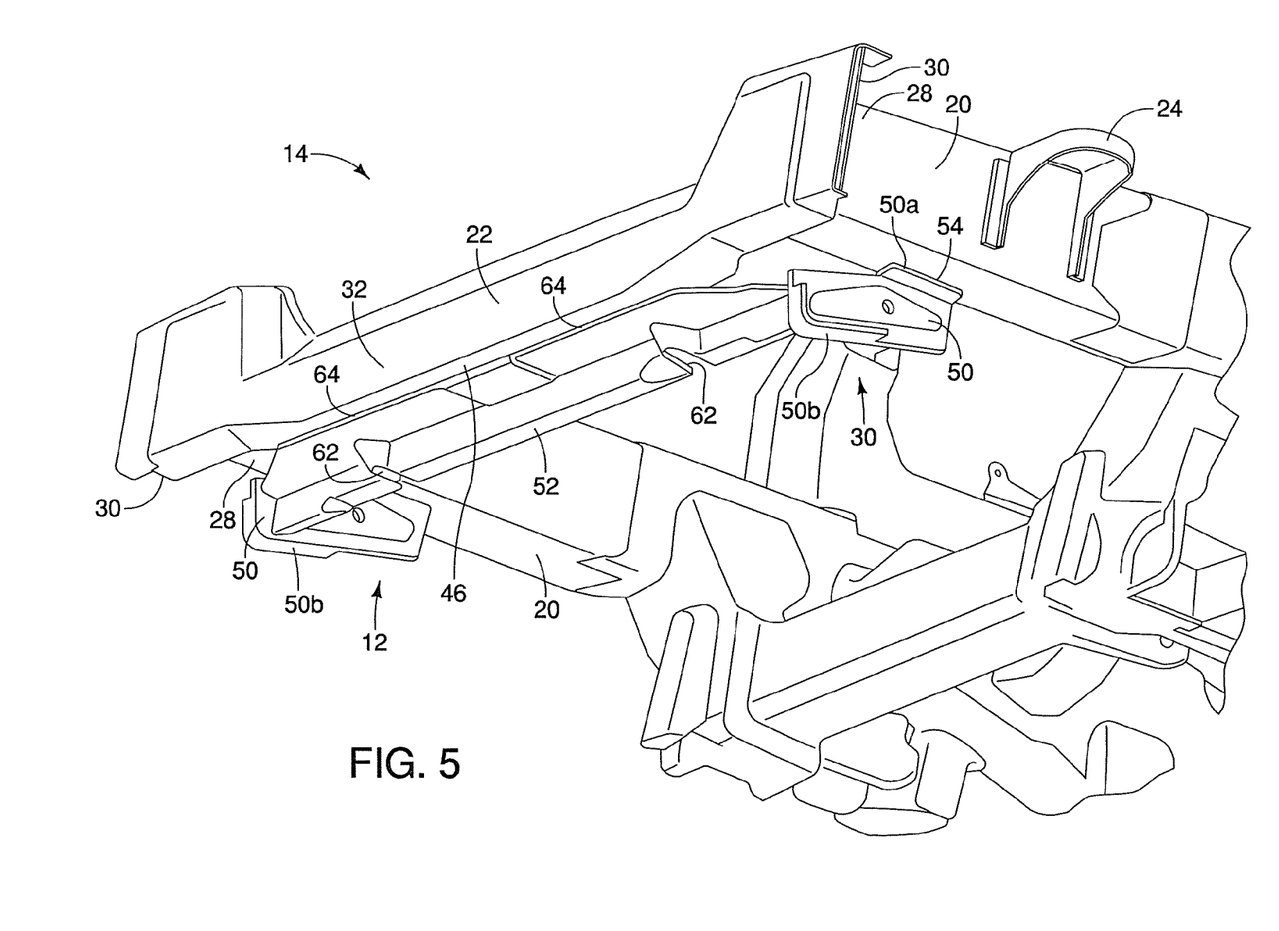
FIG. 5 is another perspective view of a front portion of the vehicle frame from a different angle showing the compatibility member attached to the members of the vehicle frame in accordance with the present invention.

The vehicle frame 14 includes many structural members, but for the purposes of describing the present invention, only those members, elements and or features associated with the present invention are described herein. As best shown in FIGS. 3, 4 and 5, the vehicle frame 14 basically includes, among other things, a pair of longitudinally extending first frame members 20 and a laterally extending second frame member 22.

As best shown in FIG. 5, the longitudinally extending first frame members 20 are spaced apart from one another supporting opposite lower side portions of the vehicle body 15 (not shown in FIG. 5) in a conventional manner. The first frame members 20 preferably extend from the front end to the rear end of the vehicle 10 providing support to the vehicle 10.

Further, the first frame members 20 define a primary support structure for the vehicle 10. Although not shown, the first frame members 20 include conventional crumple zones that are dimensioned and shaped to absorb impact energy upon impact with another structure or vehicle in a head-on or front end collision test.

As indicated in FIG. 3, the first frame members 20 include front suspension support portions 24 that support conventional suspension elements (not shown) which in turn support the front wheels W (shown in FIGS. 1 and 2). As best shown in FIGS. 3 and 4, with the vehicle 10 in an unloaded condition (with no cargo), the front wheels W support the vehicle 10 on the ground G such that the first frame members 20 are distanced above the ground G by a height $H_1$.

The laterally extending second frame member 22 is an elongated member that extends between the front portions or front ends 28 of the first frame members 20. More specifically, opposite ends 30 of the second frame member 22 are fixed to respective front ends 28 of the first frame members 20. Preferably, the ends 30 of the second frame member 22 are welded to the respective front ends 28 of the first frame members 20. Alternatively, the ends 30 of the second frame member 22 can be fastened by bolts or other similar fasteners to the front ends 28 of the first frame members 20.

As best shown in FIGS. 4 and 5, the second frame member 22 has a contoured shape with a central portion 32 that extends lower than the ends 30 of the second frame member 22. More specifically, the second frame member 22 has a flattened U-shape with the central portion 32 defining a lower portion of the U-shape and the ends 30 defining upper portions of the U-shape of the second frame member 22. The central portion 32 of the second frame member 22 is preferably oriented such that the central portion 32 is distanced above the ground G by a height $H_2$, as indicated in FIG. 3. In the depicted embodiment the height $H_1$ is greater than the height $H_2$. However, it should be understood from the drawings and description herein that the second frame member 22 can be shaped and dimensioned such that the height $H_1$ and the height $H_2$ can be equal. Alternatively, the second frame member 22 can be shaped and dimensioned such that the height $H_2$ is greater than the height $H_1$.

The bumper assembly 16 is bolted, welded or otherwise supported to at least one of the first frame members 20 and the second frame member 22. In the depicted embodiment, the bumper assembly 16 is fixed to the second frame member 22, as indicated in FIG. 3. The bumper assembly 16 basically includes a fascia member 40 and an energy absorbing member 42. The energy absorbing member 42 is a conventional bumper element that is a resilient material formed to absorb impact energy during an impact event or collision. The fascia member 40 is also a conventional resilient element that is made of a flexible material that provides an attractive appearance to the front of the vehicle 10 and covers the energy absorbing member 42. The fascia member 40 preferably has a lower edge 44 that extends downward toward an underside 46 of the second frame member 22.

The first frame members 20, the second frame member 22 and the bumper assembly 16 basically constitute the core of a primary energy absorbing structure for the vehicle 10 during an impact event or collision. Specifically, the first frame members 20, the second frame member 22 and the bumper assembly 16 are dimensioned shaped and designed to absorb a significant amount of impact energy during a head-on or front end collision test.

A description of the compatibility member 12 is now provided with specific reference to FIGS. 4-7. The compatibility member 12 is dimensioned to extend downward below the second frame member 22 of the vehicle 10 for impact absorbing contact during front end to front end impact events with vehicles having a primary energy absorbing structure that is lower than the second frame member 22 (for example, lower than the height $H_1$ or the height $H_2$) as described in greater detail below.

As best shown in FIGS. 6-10, the compatibility member 12 basically includes a pair of opposing attachment portions 50 and an elongated portion 52 that extends between the attachment portions 50. The attachment portions 50 are generally flat plate-like members that are identical except that they are symmetrical to one another. Each of the attachment portions 50 has a first rib portion 50a and a second rib portion 50b. Each of the first rib portions 50a includes an attachment surface 54. The second web portion 50b of each attachment portion 50 serves as a stiffening structure adding rigidity to the attachment portions 50. The elongated portion 52 includes opposing ends 56 that are welded or otherwise rigidly fixed to the attachment plates 50 on a side of the attachment plates 50 opposite the rib portions 50a and 50b. In other words, the rib portions 50a and 50b extend in a direction away from the elongated portion 52. The attachment surfaces 54 of the attachment portions 50 are welded or otherwise rigidly fixed to an underside of the first frame members 20, as best shown in FIGS. 4 and 5.

Figure 7:
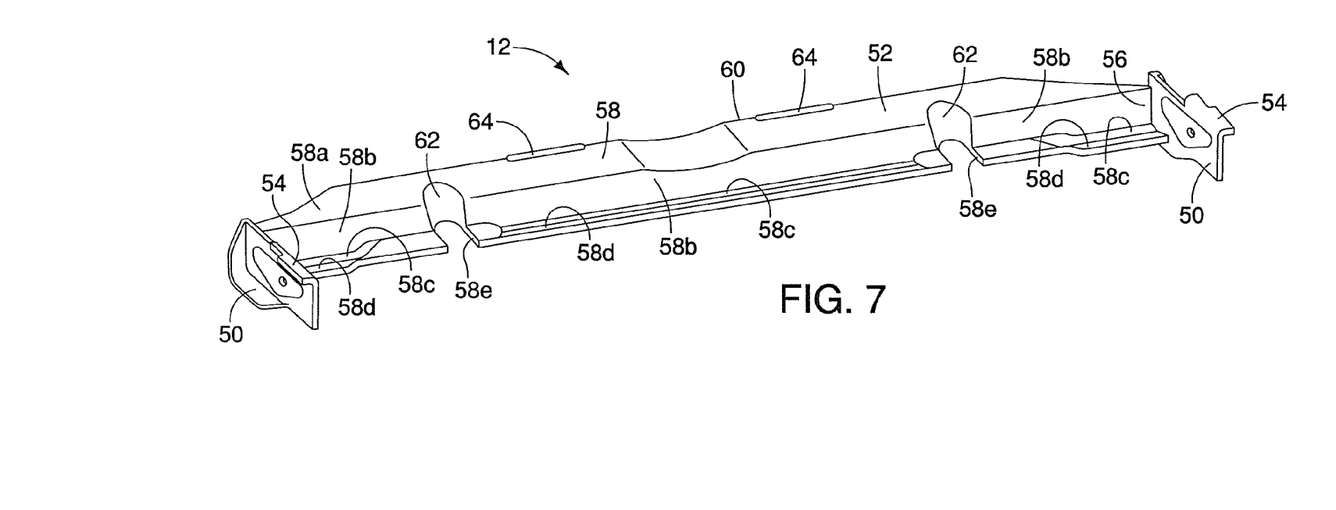
FIG. 7 is a perspective view of a rear facing side of the compatibility member shown removed from the members of the vehicle frame in accordance with the present invention.
Figure 8:
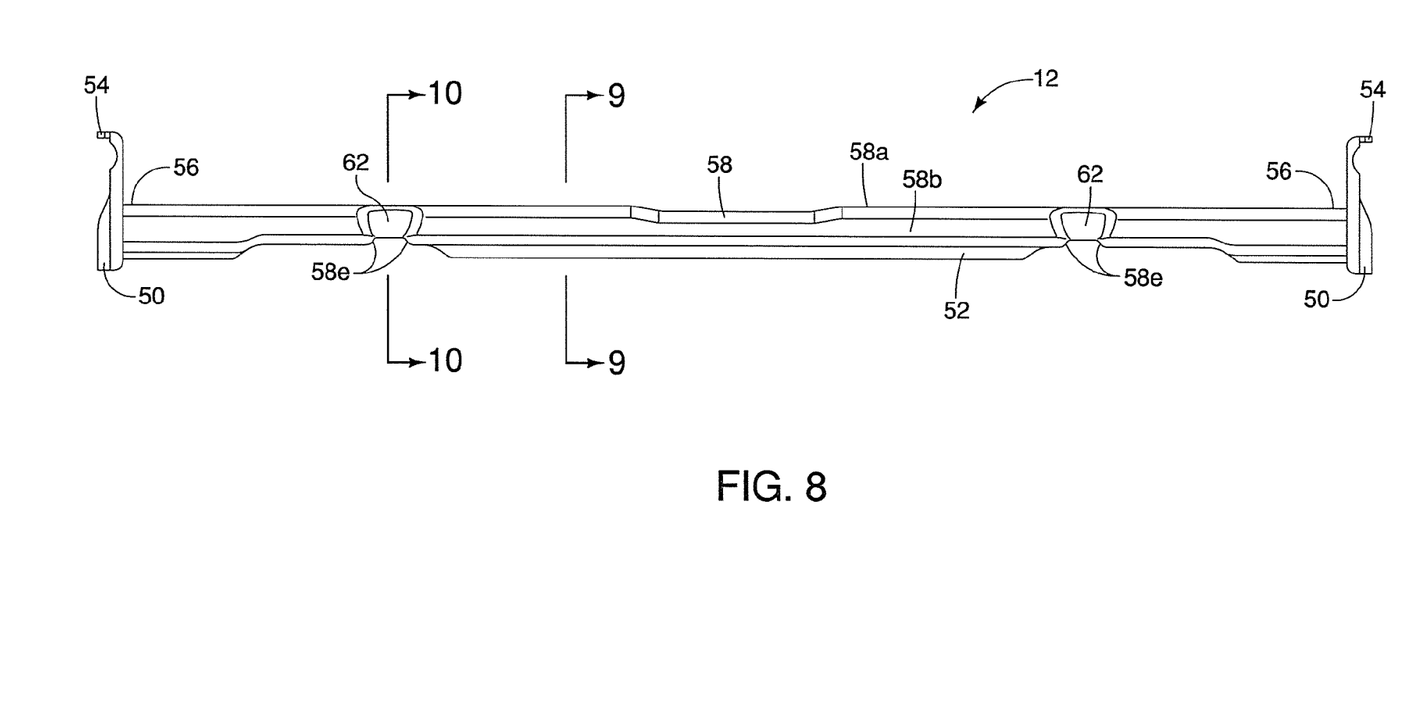
FIG. 8 is a front elevational view of the compatibility member shown removed from the members of the vehicle frame in accordance with the present invention.

As best shown in cross-section in FIGS. 9 and 10, the elongated portion 52 includes a single plate 58 (a contoured plate) that has been pressed or molded to have various contoured shapes described below. As best shown in FIGS. 7 and 10, the plate 58 has a serpentine shape along at least a portion of its respective lateral length when viewed in cross section. The serpentine shape of the plate 58 is formed along at least half of the overall length of the plate 58. The elongated portion 52 also has an overall curve from end to end (between ends 56).

Figure 9:
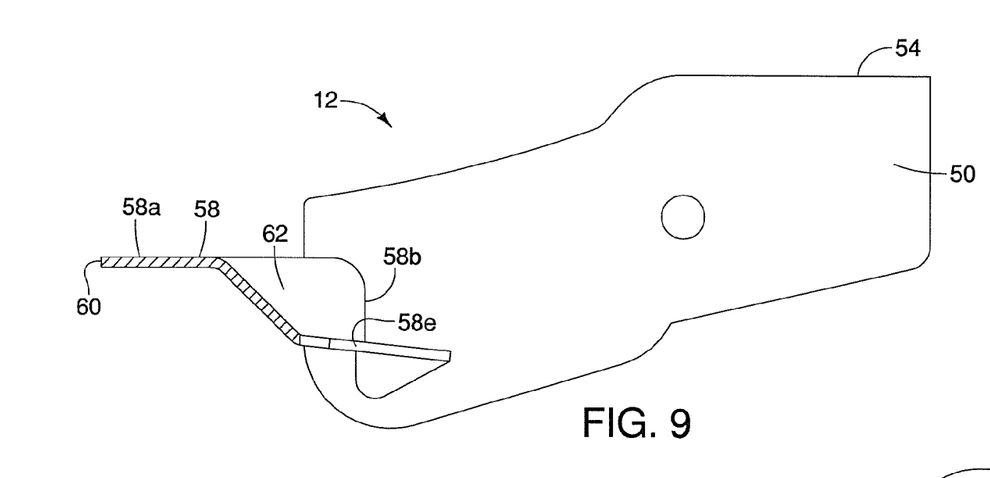
FIG. 9 is a cross-sectional view of the compatibility member taken along the line 9-9 in FIG. 8 in accordance with the present invention.
Figure 10:
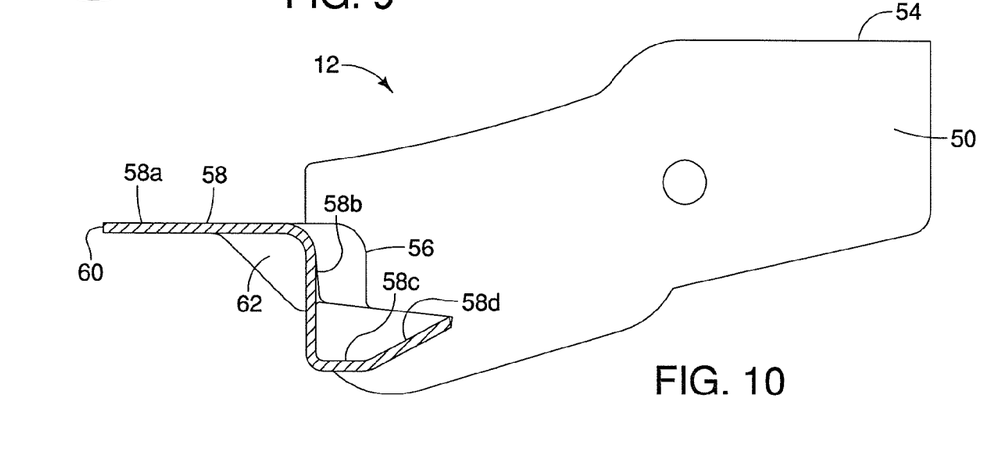
FIG. 10 is another cross-sectional view of the compatibility member taken along the line 10-10 in FIG. 8 in accordance with the present invention.

It should be understood from the drawings that the cross section shown in FIGS. 9 and 10 is taken in a longitudinal vehicle direction. Specifically, the longitudinal vehicle direction cross section of FIGS. 9 and 10 extends in a direction parallel to the lengthwise direction of the vehicle 10.

The elongated portion 52 has a front edge 60 (see FIGS. 6, 9 and 10), a pair of recessed sections 62 (see FIGS. 6, 7, 8 and 10) and two attachment sections 64 (welding attachment points). The attachment sections 64 are best shown in FIGS. 5 and 7.

Figure 6:
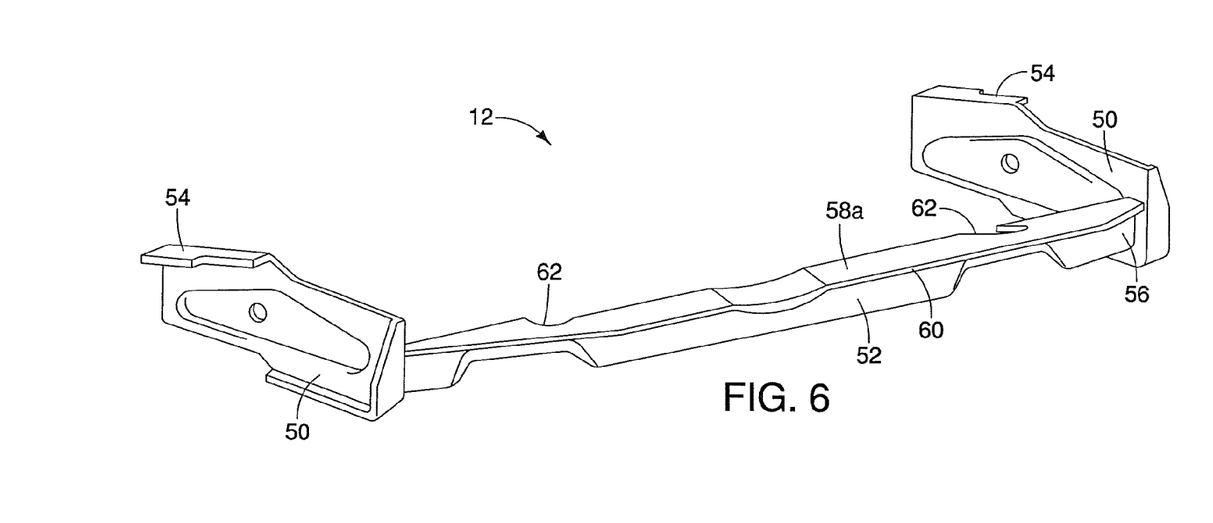
FIG. 6 is a perspective view of a front facing side of the compatibility member shown removed from the members of the vehicle frame in accordance with the present invention.

The front edge 60 that has a slight curved contour, as indicated in FIG. 6. The recessed sections 62 are provided to accommodate suspension elements (not shown) or other vehicle components (not shown). The recessed sections 62 are basically conical shaped concavities that interrupt the serpentine shape of each of the plate 58. The recessed sections 62 can also serve as crumple zones that absorb impact energy during collision impact events where the object or vehicle impacted is lower than the bumper assembly 16.

The attachment sections 64 are shaped to mate with the underside of the second frame member 22. More specifically, the two attachment sections 64 are weld points for rigid connection to the underside of the central portion 32 of the second frame member 22 as shown in FIG. 5.

As is best shown in FIGS. 7, 9 and 10, the plate 58 that defines the elongated portion 52 is provided with an offset contour with a plurality of offset sections 58a, 58b, 58c and 58d that at least partially define the serpentine shape or contour. The offset section 58a extends the entire lateral length of elongated portion 52, as shown in FIGS. 6 and 7. In the region of the recessed sections 62, the offset section 58a is narrowed, compared to the remainder of the elongated portion 52, as indicated in FIG. 9. The offset sections 58b, 58c and 58d extend the majority of the lateral length of the elongated portion, but are interrupted by the recessed sections 62, as is also shown in FIG. 7. As well, in the areas adjacent to the recessed sections, the offset sections 58c and 58d gradually curve together to form edges 58e that at least partially define the recessed sections 62.

The offset sections 58a, 58b, 58c and 58d provide the elongated portion 52 of the compatibility member 12 with a predetermined level of rigidity to resist deformation upon low speed impact, but with the capability to deform and absorb impact energy at moderate and higher speed impacts. More specifically, the offset section 58a serves as a contact portion and the offset sections 58a, 58c and 58d serve as reinforcements during an impact event where contact is made with the offset section 58a. Further, the offset sections 58c and 58d further define a reinforcement flange that extends rearward from the offset section 58b (the contact portion).

The offset sections 58a and 58c are preferably parallel to one another, as indicated in FIG. 10. The offset section 58b is preferably approximately perpendicular to the offset sections 58a and 58c. The offset section 58d is preferably slightly angularly offset from the offset section 58c, as shown in FIG. 10.

As best shown in FIG. 3, the lowest portion of the underside of the compatibility member 12 is distanced from the ground G by a height $H_3$. As is indicated in FIG. 3, the height $H_3$ is less than either of the height $H_1$ or the height $H_2$. Hence as shown in FIG. 3, the compatibility member 12 extends laterally between the first frame members 20, with at least a portion of the compatibility member 12 extending below the second frame member 22 adjacent to and rearward from the lower edge 44 of the facia member 42.

The compatibility member 12 is dimensioned to extend downward below the second frame member 22 of the vehicle 10 for impact absorbing contact with vehicles or objects that are lower than the bumper assembly 16. For example, the compatibility member 12 can contact other vehicles having primary energy absorbing structures that are lower than the second frame member 22 in collision or impact events. During front end to front end impact tests, the compatibility member 12 ensures impact with primary energy absorbing structures of vehicles that are lower to the ground. For example, for a vehicle that has primary energy absorbing structures with a height below the height $H_1$, the compatibility member 12 extends downward a distance that provides an impact surface against which the lower vehicles or objects can impact.

The suspension, inner and outer body parts, passenger compartment, engine and drive train, etc. of the vehicle 10 are conventional components that are well known in the art. Since these parts and components are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the present invention. Accordingly, these terms, as utilized to describe the present invention should be interpreted relative to a vehicle equipped with the present invention.

The term "configured" as used herein to describe a component, section or part of a device includes hardware and/or software that is constricted and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle body structure comprising:
    a vehicle frame having
        a pair of longitudinally extending first frame members spaced apart from one another supporting opposite lower side portions of a vehicle, each of the pair of longitudinally extending first frame members extending between front and rear ends of the vehicle frame;
        a laterally extending second frame member extending between respective front portions of the first frame members;
    a vehicle body supported on the vehicle frame;
    a bumper assembly supported by at least one of the first frame members and the second frame member; and
    a compatibility member extending laterally between and rigidly fixed to each of the first frame members, with at least a portion of the compatibility member extending below the second frame member, the compatibility member having at least one attachment point fixed to the second frame member, the compatibility member being spaced apart from the bumper assembly.

2. The vehicle body structure according to claim 1, wherein the compatibility member includes a pair of opposing attachment portions fixed to the first frame members and an elongated portion extending between the pair of opposing attachment portions, the elongated portion including at least one attachment point.

3. The vehicle body structure according to claim 2, wherein the elongated portion includes two attachment points fixed to the second frame member.

4. The vehicle body structure according to claim 2, wherein the attachment point is located at the underside of the second frame member.

5. The vehicle body structure according to claim 1, wherein the compatibility member includes two attachment points fixed to the underside of the second frame member.

6. The vehicle body structure according to claim 1, wherein opposite ends of the second frame member are attached to respective front ends of the first frame members.

7. The vehicle body structure according to claim 6, wherein the second frame member has a contoured shape with a central portion that extends lower than the opposite ends of the second frame member.

8. The vehicle body structure according to claim 7, wherein the compatibility member includes a pair of opposing attachment portions fixed to the first frame members and an elongated portion extending between the pair of opposing attachment portions, the elongated portion including the attachment point.

9. The vehicle body structure according to claim 8, wherein the attachment point of the elongated portion of the compatibility member is located at an underside of the central portion of the second frame member.

10. The vehicle body structure according to claim 8, wherein
    the attachment portions of the compatibility member are fixed to the respective undersides of the first frame members.

11. The vehicle body structure according to claim 8, wherein
    the attachment portions of the compatibility member are attached to the respective undersides of the first frame members.

12. The vehicle body structure according to claim 1, wherein
    the compatibility member is dimensioned to extend downward below the second frame member of the vehicle for impact absorbing contact with vehicles having a primary energy absorbing structure lower than the second frame member in impact events.

13. A vehicle body structure comprising:
    a vehicle frame having
        a pair of longitudinally extending first frame members spaced apart from one another supporting opposite lower side portions of a vehicle;
        a laterally extending second frame member extending between respective front portions of the first frame members, the second frame member having a contoured shape with a central portion that extends lower than outer opposite ends of the second frame member;
    a vehicle body supported on the vehicle frame;
    a bumper assembly supported by at least one of the first frame members and the second frame member; and
    a compatibility member extending laterally between the first frame members, with at least a portion of the compatibility member extending below the second frame member, the compatibility member having at least one attachment point fixed to the second frame member.

14. The vehicle body structure according to claim 13, wherein the attachment point of the elongated portion of the compatibility member is located at an underside of the central portion of the second frame member.

15. The vehicle body structure according to claim 14, wherein
the attachment portions of the compatibility member are fixed to the respective undersides of the first frame members.

16. The vehicle body structure according to claim 1, wherein
the portion of the compatibility member below the second frame member comprises an elongated contoured plate member having a first section and a second section angularly offset from one another, the first section extending along the lateral length of the elongated contoured plate and the second section extending along at least half the lateral length of the elongated contoured plate.

17. The vehicle body structure according to claim 16, wherein
the elongated contoured plate member includes a third section that is perpendicular to both the first section and the second section, the third section extending along at least half of the lateral length of the elongated contoured plate of the elongated contoured plate.

18. The vehicle body structure according to claim 1, wherein the compatibility member comprises:
a mounting portion attached to the second frame member; and
a contact portion extending from the mounting portion and configured and arranged to absorb impact energy.

19. The vehicle body structure according to claim 18, wherein
the contact portion is perpendicular to the mounting portion.

20. The vehicle body structure according to claim 18, wherein
the contact portion extends generally vertically.

21. The vehicle body structure according to claim 18, wherein the compatibility member comprises:
a reinforcement flange extending rearward of the contact portion.

22. The vehicle body structure according to claim 21, wherein
the reinforcement flange extends from a distal edge of the compatibility member.

23. The vehicle body structure according to claim 1, wherein
a front bumper fascia member with a lower surface is disposed downward from an underside of the second frame member and;
the compatibility member is disposed between the underside of the fascia and the second frame member.

24. The vehicle body structure according to claim 1, wherein
the compatibility member is rigidly fixed to an underside of the first frame members.

25. The vehicle body structure according to claim 1, wherein
the compatibility member has a forward most portion that is disposed rearward of a forward most portion of the second frame member.

* * * * *